United States Patent [19]
Sato

[11] Patent Number: 5,956,328
[45] Date of Patent: Sep. 21, 1999

[54] SPREAD SPECTRUM COMMUNICATIONS SYSTEM

[75] Inventor: Toshifumi Sato, Tokyo, Japan

[73] Assignee: NEC Corporation, Japan

[21] Appl. No.: 08/759,146

[22] Filed: Dec. 2, 1996

[30]  Foreign Application Priority Data

Nov. 30, 1995 [JP]  Japan ................................. 7-312391

[51] Int. Cl.$^6$ .............................. H04B 7/216; H04J 13/00
[52] U.S. Cl. ......................... 370/335; 370/204; 375/200
[58] Field of Search ..................................... 370/204, 320, 370/335, 342, 441, 206; 375/200, 206

[56]  References Cited

U.S. PATENT DOCUMENTS

| | | | |
|---|---|---|---|
| 4,930,140 | 5/1990 | Cripps et al. | 375/200 |
| 5,729,570 | 3/1998 | Magill | 370/204 |
| 5,737,329 | 4/1998 | Horiguchi | 370/342 |

OTHER PUBLICATIONS

I. Shimizu et al., "Design Concept of TDMA Cellular Mobile Radio Units", IEEE VTC, 1992, pp. 570–573.
Mobile Station–Base Station Compatibility Standard for Dual–Mode Wideband Spread Spectrum Cellular System, TIA/EIA/IS 95, pp. 6–8.

*Primary Examiner*—Chi H. Pham
*Assistant Examiner*—Frank Duong
*Attorney, Agent, or Firm*—Ostrolenk, Faber, Gerb & Soffen, LLP

[57]  ABSTRACT

In a data transmission system, transmission data is modulated based on $\pi/4$-shift QPSK modulation according to two spreading code sequences which are generated according to a chip timing signal in each symbol interval. At a receiving side, the received spread spectrum signal is demodulated based on the same $\pi/4$-shift QPSK modulation according to the respective replicas of the spreading code sequences.

44 Claims, 8 Drawing Sheets

SPREAD SPECTRUM COMMUNICATIONS SYSTEM

BACKGROUND OF THE INVENTION

1. Field of the Invention

The present invention generally relates to a mobile communications system using a spread spectrum (SS) scheme, and in particular to transmitting and receiving circuits for use in the mobile communications system.

2. Description of the Related Art

There have been known the following schemes for cellular mobile terminals and base stations: Personal Digital Cellular (PDC: RCR STD 27) of the RCR (Research & Development Center for Radio System) in Japan, Interim Standard 54 (IS 54) of the TIA (Telecommunications Industry Association) in North America, and Global System for Mobile Communications (GSM) of the ETSI (European Telecommunications Standard Institute) in Europe, are Time Division Multiple Access (TDMA) systems. Further, Interim Standard 95 (IS 95) released by TIA in North America is a Code Division Multiple Access (CDMA) system.

The RCR and IS 54 have adopted a π/4-shift DQPSK (Differential Quadrature Phase Shift Keying) modulation scheme, providing a reduced amplitude variation which permits a transmitter to employ a high-efficiency power amplifier. The π/4-shift DQPSK modulator and demodulator are described in an article written by Shimizu et al., "Design Concept of TDMA Cellular Mobile Radio Units" (IEEE VTC '92). The GSM has adopted another modulation scheme, Gaussian Filtered Minimum Shift Keying (GMSK). The GMSK modulation provides a smoothing of the phase transitions at symbol boundaries and preserves a constant-envelope property of a transmitted signal. Compared to the π/4-shift DQPSK modulation, however, the GMSK modulation causes the spectrum to be expanded, resulting in reduced bandwidth-efficiency.

On the other hand, is the IS 95, according to the document released by TIA (TIA/EIA/IS 95, pp 6–8), in a reverse channel or uplink, Binary PSK and Offset QPSK are used as the first modulation and the second modulation, respectively. In a forward channel or downlink, Binary PSK and QPSK are used as the first modulation and the second modulation, respectively.

In CDMA systems such as IS 95, the first modulation cannot adopt QPSK but only Binary PSK. In the uplink, only a combination of Binary PSK for the first modulation and Offset QPSK for the second modulation is permitted in a CDMA system. The reason is that the QPSK for the use of first modulation may cause undesired phase transitions of π at symbol boundaries, resulting in the loss of the advantage that Offset QPSK provides a very small amplitude variation. See the crossed dashed lines in FIG. 10B.

Since the symbol rate of Binary PSK is twice as high as that of QPSK in the case of the same bit rate, a spreading ratio of Binary PSK, which is defined as the number of chips per symbol duration, is reduced to a half that of QPSK, causing a reduced length of spreading code. Especially when an adaptive despreading filter is used to eliminate interference on the same frequency, a reduction of the spreading code length becomes a significant problem because the number of interference waves to be eliminated depends on the spreading ratio. Therefore, if possible, the first modulation preferably should adopt QPSK rather than Binary PSK.

Further, in the case of Offset QPSK, it is necessary for a receiver to sample a received signal at a sampling rate of twice the chip rate to obtain a correlation value. In the case of QPSK or π/4-shift QPSK, the sampling rate is equal to the chip rate. Therefore, in a broadband CDMA system adopting the Offset QPSK modulation scheme, it is more difficult to implement its hardware as the chip rate increases.

Furthermore, in the case of Offset QPSK, the respective signal points of a received signal are smeared into a circular shape like a cloud on a four-phase signal constellation at sampling time points as shown in FIG. 10B. Therefore, a possibility of interference between in-phase and quadrature-phase components arises, resulting in deteriorated characteristics of the receiver.

SUMMARY OF THE INVENTION

An object of the present invention is to provide a spectrum spreading and despreading system which achieves an easy hardware implementation in a receiver with lower power consumption.

Another object of the present invention is to provide receiving and transmitting circuits in a CDMA system which is able to adopt QPSK for the first modulation with low variations in amplitude.

Still another object of the present invention is to provide a CDMA mobile communications system which achieves reliable wireless communications between a base station and a mobile terminal.

According to the present invention, transmission data is spectrum-spread according to π/4-shift QPSK modulation depending on two spreading code sequences. The spread spectrum signal is despread according to the same π/4-shift QPSK modulation depending on the respective replicas of the spreading code sequences.

In a data transmission system according to the present invention, a transmitter includes a spreading code generator which generates two spreading code sequences according to a chip timing signal in each symbol interval and a spreading circuit which performs the spectrum spreading of transmission parallel data such that the parallel data is modulated based on the π/4-shift QPSK scheme according to the spreading code sequences to produce quadrature spread spectrum signals. A transmission signal is produced based on the quadrature spread spectrum signals and is transmitted.

A receiver includes a replica generator which generates two despreading code sequences which are replicas of the spreading code sequences, respectively, and a despreading circuit which performs the spectrum despreading of received quadrature spread spectrum signals such that the received quadrature spread spectrum signals are demodulated based on the π/4-shift QPSK scheme according to the despreading code sequences to produce received despread data. Received data is reproduced from the received despread data. A symbol timing signal and a chip timing signal are recovered from the received quadrature spread spectrum signals and the received data. The chip timing signal is used for sampling of the received quadrature spread spectrum signals.

In the data transmission system, a communication apparatus such as a mobile telephone terminal may be comprised of the transmitter and the receiver.

Since the transmission signal is produced by the π/4-shift QPSK spreading circuit, the envelope of the transmission signal has relatively low amplitude variations. Therefore, considerably lower power consumption is achieved in the transmitter. Further, since the need for the power amplifier to have linearity over a wide input range is eliminated, there is no need to use a Class-A amplifier, having relatively low efficiency as the power amplifier. Furthermore, since the QPSK scheme can be used as the first modulation, the spreading ratio is twice as large as in the case of the Binary PSK scheme. This means that the sequence length of the spreading code is also twice as long as in the Binary PSK, resulting in improved reliability of the CDMA system.

In the receiver, since the chip timing signal is used for sampling of the received quadrature spread spectrum signals, compared with the conventional receiver employing the Offset QPSK scheme, the necessary sampling clock frequency can be reduced to one-half, resulting in considerably less power consumption in the receiver. Further, since the π/4-shift QPSK spreading and despreading circuit is employed, the respective signal points of a received signal are concentrated into predetermined signal points of its constellation at sampling time points. Therefore, there is substantially no interference between in-phase and quadrature-phase components, resulting in improved characteristics of the receiver.

DETAILED DESCRIPTION OF THE PREFERRED EMBODIMENTS

A base station and a mobile terminal in a CDMA mobile communications system are provided with a spread spectrum transmitter and a spread spectrum receiver according to the present invention to communicate with each other.

SPREAD SPECTRUM TRANSMITTER

Figure 1:
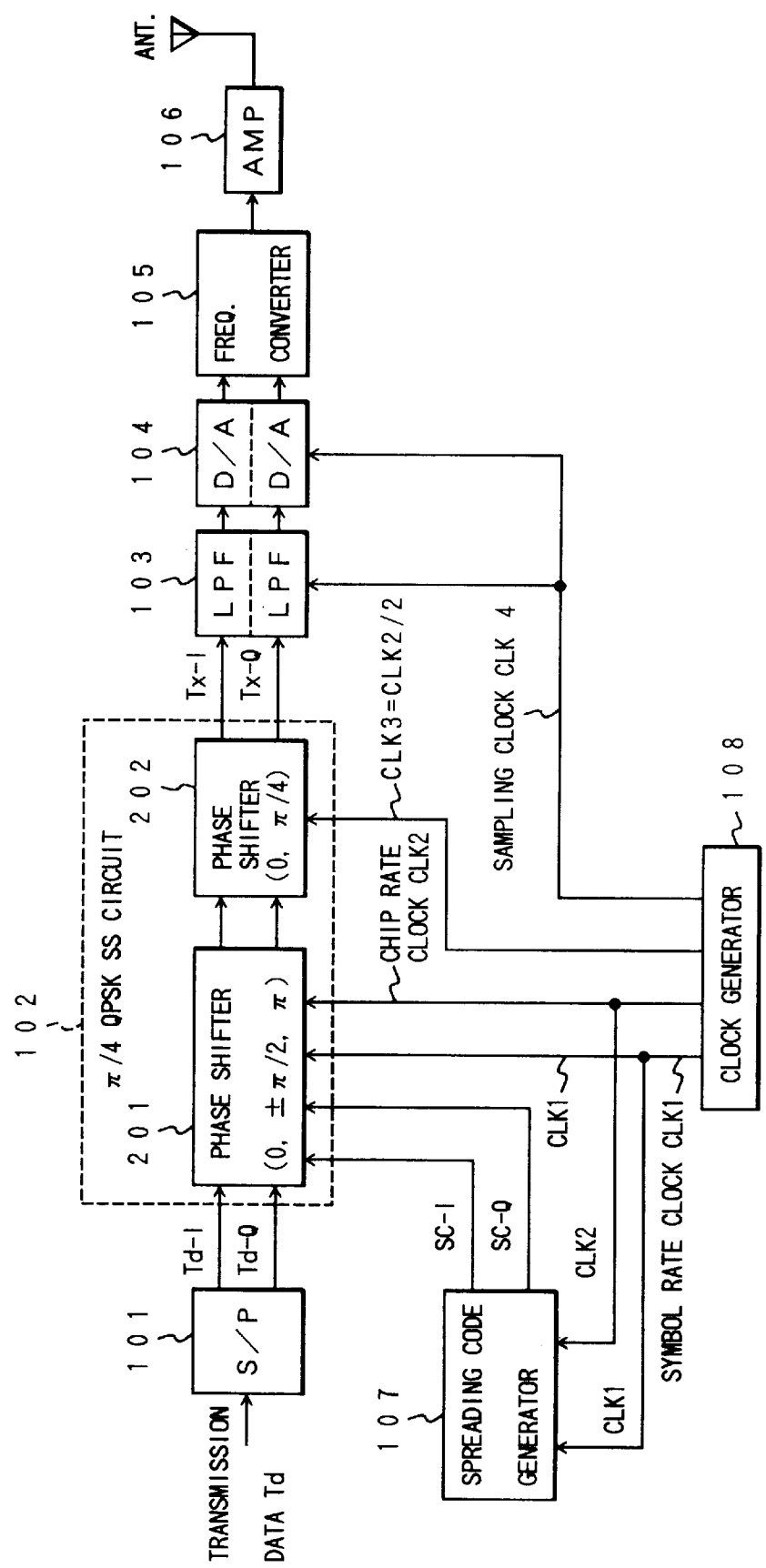
FIG. 1 is a block diagram showing a first embodiment of a transmitting circuit for use in a spread spectrum mobile communications system according to the present invention.

Referring to FIG. 1, the transmitter adopts a QPSK modulation scheme for the first modulation and a π/4-shift QPSK spectrum spreading scheme for the second modulation. A serial transmission data signal Td is converted into two-bit parallel data signals Td-I (in-phase component) and Td-Q (quadrature component) by a serial-to-parallel converter 101. Hereinafter, an in-phase component and a quadrature component in an I-Q orthogonal coordinate system are indicated by '-I' and '-Q'. The two-bit parallel data signals Td-I and Td-Q are subjected to π/4-shift QPSK spectrum spreading by a π/4-shift QPSK spreading circuit 102 to produce a spread signal (Tx-I, Tx-Q) as described in detail later. The spread component signals Tx-I and Tx-Q are output to a digital low-pass filter 103 such as a root-raised cosine filter where the respective spread component signals are spectrum-shaped for transmission. The respective output signals of the low-pass filter 103 are converted to analog signals by a digital-to-analog converter 104 and the analog baseband signals are then converted from a baseband frequency to a radio frequency by a frequency converter 105 including an adder to produce a radio transmission signal. The radio transmission signal is amplified by a power amplifier 106 and then is transmitted from an antenna.

The transmitter is further provided with a spreading code generator 107 and a clock generator 108. The spreading code generator 107 generates two-bit parallel spreading code (SC-I, SC-Q) and outputs it to the π/4-shift QPSK spreading circuit 102. The two-bit parallel spreading code (SC-I, SC-Q) is an orthogonal-code, or a set of orthogonal sequences which is typically a Walsh-Hadamard code or an orthogonal Gold code.

More specifically, the orthogonal sequences are generated by a processor (not shown) and are stored onto the spreading code generator 107. The two-bit parallel spreading code (SC-I, SC-Q) is generated by the spreading code generator 107 repeatedly reading the orthogonal sequences in each chip interval. Alternatively, the spreading code generator 107 may be provided with a feedback shift register for each of the I and Q channels, which is set to a different initial value. The two-bit parallel spreading code (SC-I, SC-Q) is generated by each shift register operating in chip timing. Actually, the system can use a short code, a long code, or a combination of the short code and the long code. For simplicity, hereinafter the following description will be made taking the case of the short code as example.

The clock generator 108 generates a symbol-rate clock signal CLK1, a chip-rate clock signal CLK2, an even-odd discrimination clock signal CLK3 which is obtained by dividing the chip-rate clock signal CLK2 by two, and a sampling clock signal CLK4 whose frequency is two times or more as high as the chip rate. The symbol-rate clock signal CLK1 and the chip-rate clock signal CLK2 are supplied to the spreading code generator 107 for spreading code generation. The symbol-rate clock signal CLK1, the chip-rate clock signal CLK2, and the even-odd discrimination clock signal CLK3 are supplied to the π/4-shift QPSK spreading circuit 102. The sampling clock signal CLK4 is supplied to the low-pass filter 103 and the digital-to-analog converter 104.

The π/4-shift QPSK spreading circuit 102 is comprised of a first phase shifter 201 and a second phase shifter 202. The first phase shifter 201 is a QPSK spreading circuit which selects a phase shift amount from 0, +π/2, −π/2 and π depending on the two-bit spreading code (SC-I, SC-Q) received from the spreading code generator 107 and then shifts the phase of the parallel data (Td-I, Td-Q) by the selected phase shift amount to produce phase-shifted data (Td-Is, Td-Qs) in accordance with the symbol-rate clock signal CLK1 and the chip-rate clock signal CLK2. The second phase shifter 202 selects a phase shift amount from 0 and π/4 according to the even-odd discrimination clock signal CLK3 and then shifts the phase of the data (Td-Is, Td-Qs) by the selected phase shift amount to produce the spread component signals Tx-I and Tx-Q.

More specifically, the first phase shifter 201 performs a phase shifting operation according to the two-bit parallel spreading code (SC-I, SC-Q) as shown in the following table I.

TABLE I

| (SC-I, SC-Q) | PHASE SHIFT |
| --- | --- |
| (0, 0) | 0 |
| (1, 0) | π/2 |
| (1, 1) | π |
| (0, 1) | −π/2 |

Such a phase shifting operation is realized by a changing of components between I and Q and a sign inversion as described hereinafter.

Figure 2:
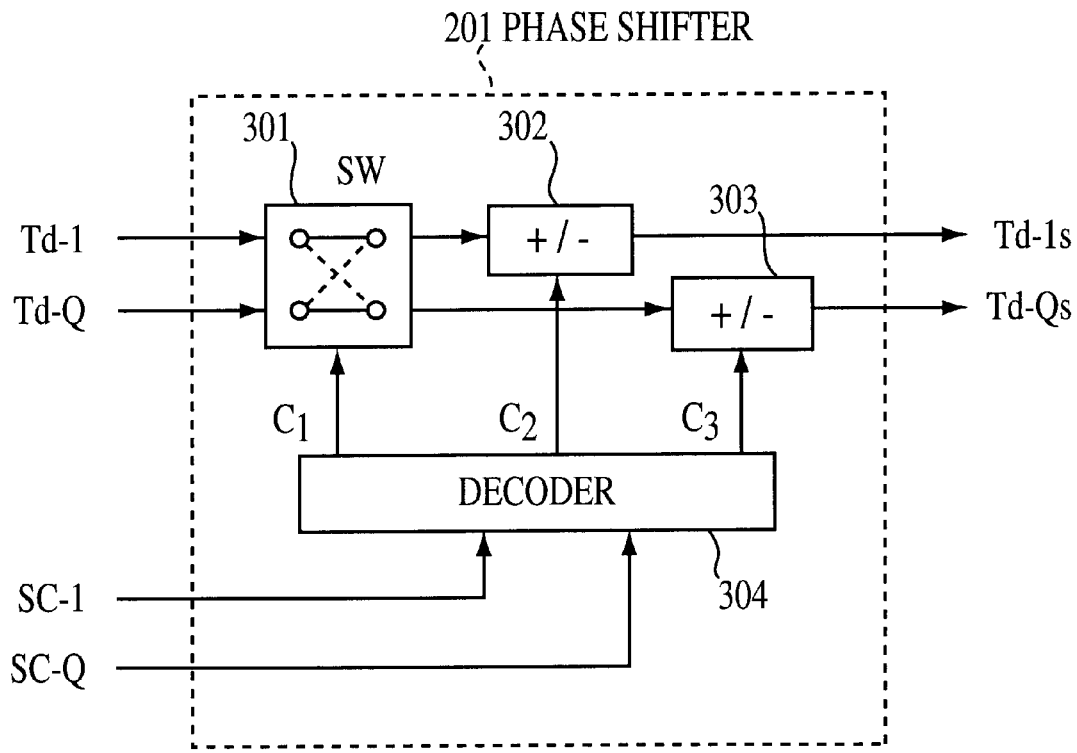
FIG. 2 is a detailed block diagram showing a phase shifter of the π/4-shift QPSK spreading circuit in the transmitting circuit as shown in FIG. 1.

Referring to FIG. 2, the first phase shifter 201 may be comprised of a switching circuit 301, sign inverters 302 and 303, and a parallel code decoder 304. The switching circuit 301 receives the parallel data (Td-I, Td-Q) and changes the components between parallel data (Td-I, Td-Q) according to a switching control signal C1. The I and Q output components of the switching circuit 301 are input to the sign inverters 302 and 303 which are controlled by inverting control signals C2 and C3 to produce shifted parallel component data Td-Is and Td-Qs, respectively. The parallel code decoder 304 outputs the switching control signal C1 to the switching circuit 301 when SC-I is not coincident with SC-Q, outputs the inverting control signal C2 to the sign inverter 302 when SC-Q=1, and outputs the inverting control signal C3 to the sign inverter 303 when SC-I=1.

On the other hand, the second phase shifter 202 performs a phase shifting operation of the parallel data (Td-Is, Td-Qs) according to the even-odd discrimination clock signal CLK3 as shown in the following table II.

TABLE II

| EVEN/ODD CHIP DISCRIMINATION | PHASE SHIFT |
| --- | --- |
| EVEN CHIP | 0 |
| ODD CHIP | π/4 |

Figure 10A:
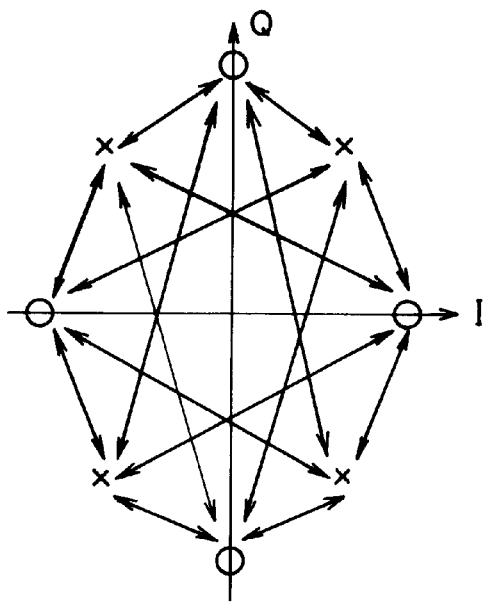
FIG. 10A is a diagram showing a signal constellation of π/4-shift QPSK.
Figure 10B:
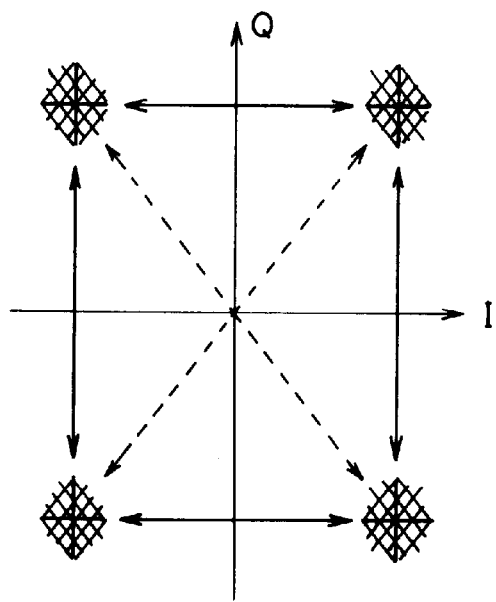
FIG. 10B is a diagram showing a signal constellation of Offset QPSK adopted in a conventional CDMA system.

Such a phase shifting operation is realized by using the parallel data (Td-Is, Td-Qs) and the even-odd discrimination clock signal CLK3 to address a read-only memory (ROM) which previously stores eight (8) possible values of (Tx-I, Tx-Q) as shown in FIG. 10A.

Figure 3:
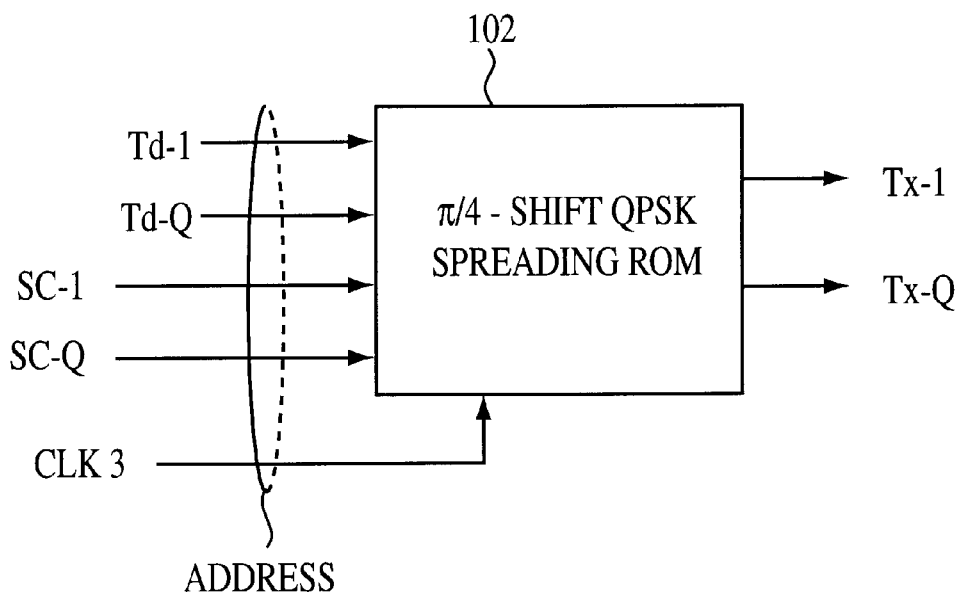
FIG. 3 is a block diagram showing another example of a π/4-shift QPSK spreading circuit in the transmitting circuit as shown in FIG. 1.

Referring to FIG. 3, the π/4-shift QPSK spreading circuit 102 may be also comprised of a conversion table stored in a ROM. The parallel data (Td-I, Td-Q), the spreading code (SC-I, SC-Q), and the even-odd discrimination clock signal CLK3 are used as an address to read the spread component signals Tx-I and Tx-Q from the ROM.

TRANSMITTING OPERATION

Again referring to FIG. 1, the transmitting operation will be described more specifically. It is assumed that the bit rate of the serial transmission data Td is 120 kbps (bits per second), the symbol rate is 60 ksps (symbols per second), and the chip rate is 3.84 Mcps (chips per second). Therefore, the clock generator 108 generates the symbol-rate clock signal CLK1 of 60 kHz, the chip-rate clock signal CLK2 of 3.84 MHz, and the even-odd discrimination clock signal CLK3 of 1.92 MHz. In this embodiment, the sampling frequency which is supplied to the low-pass filter 103 and the D/A converter 104 is four times higher than the chip rate. Therefore, the clock generator 108 generates the sampling clock signal CLK4 of 15.36 MHz.

A serial transmission data Td of 120 kbps is converted into two-bit parallel data (Td-I, Td-Q) of 60 kbps by the serial-to-parallel converter 101. The two-bit parallel data (Td-I, Td-Q) corresponding to one symbol of QPSK modulation are input to the first phase shifter 201 which performs the QPSK spectrum spreading of the two-bit parallel data (Td-I, Td-Q) in accordance with the two-bit parallel spreading code (SC-I, SC-Q) of 3.84 Mcps as described in TABLE I. The two-bit parallel spreading code (SC-I, SC-Q) is generated by the spreading code generator 107 repeatedly reading the predetermined spreading code sequences at symbol periods of 1/60 ksps. Therefore, the length of the predetermined spreading code sequence is 64 chips. Further, the second phase shifter 202 performs the π/4 phase shifting of the shifted parallel data (Td-Is, Td-Qs) as described in TABLE II to produce the spread signal (Tx-I, Tx-Q).

Subsequently, the spread component signals Tx-I and Tx-Q are spectrum-shaped by the low-pass filter 103 in accordance with the sampling clock CLK4. The low-pass filter 103 is a Root-Raised Cosine filter having a 3 dB-cutoff frequency of 1.92 MHz and a roll-off factor of 0.3 with a radio frequency bandwidth of 5 MHz (=3.84 MHz×1.3). Such a digital filter is easily realized by using an interpolation FIR filter.

The spectrum-shaped spread signals are converted into analog by the D/A converter 104 and, after that, the analog baseband signals are converted from a baseband frequency to a radio frequency by the frequency converter 105. The radio transmission signal is amplified by the high-efficiency power amplifier 106.

Since the radio transmission signal is produced by the π/4-shift QPSK spreading circuit 102 and the low-pass filter 103, the radio transmission signal has relatively low variations of its envelope. Therefore, considerably less power is consumed in the transmitter. Further, the need for linearity over a wide input range is eliminated from the power amplifier 106. In other words, there is no need to use a Class-A amplifier having relatively low efficiency as the power amplifier 106.

Furthermore, since the QPSK scheme can be used as the first modulation, the spreading ratio is twice as large as in the case of the Binary PSK scheme. This means that the sequence length of spreading code (short code) is also twice as long as in the Binary PSK, resulting in improved reliability of the CDMA system.

SPREAD SPECTRUM RECEIVER

Figure 4:
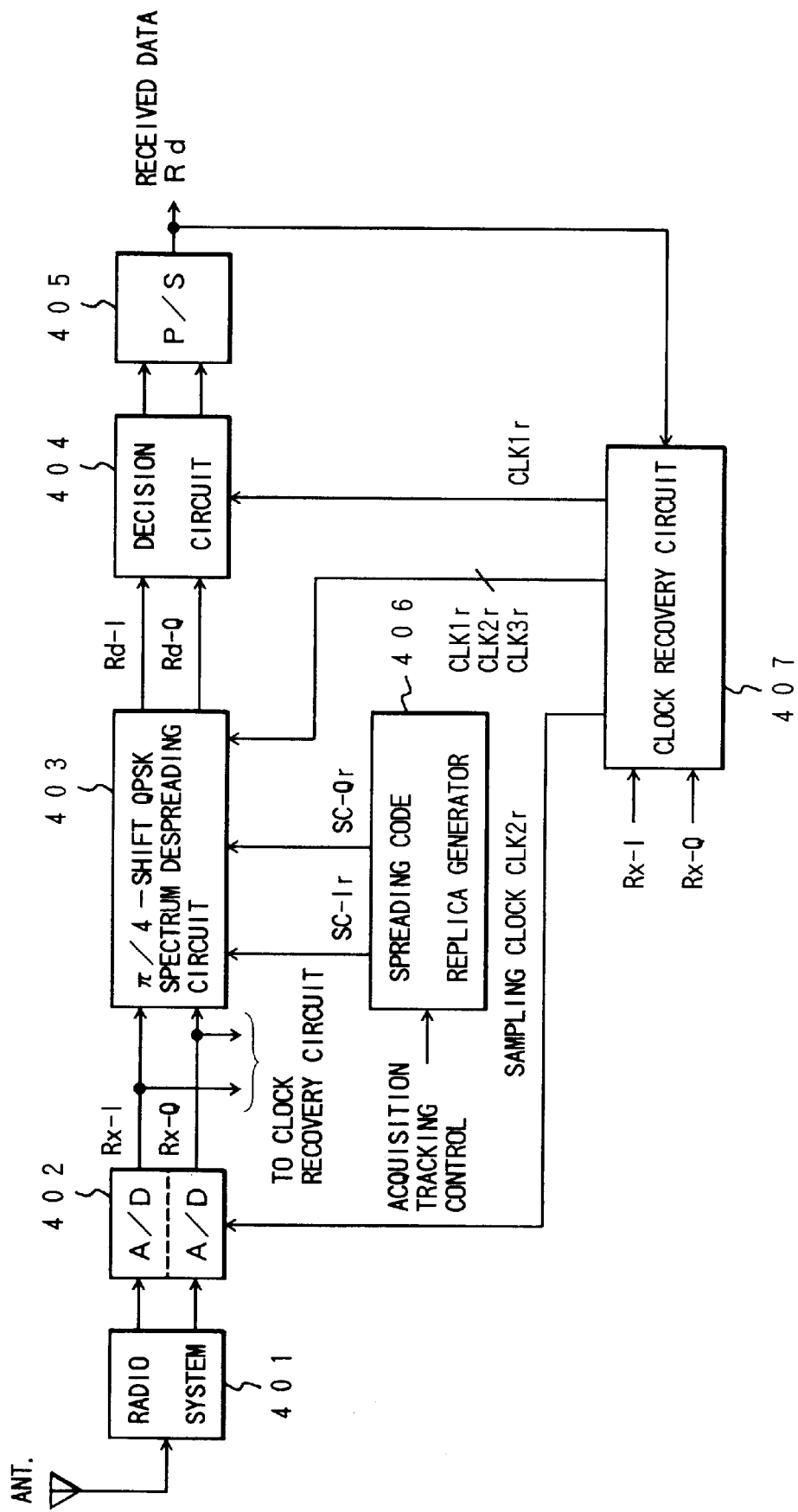
FIG. 4 is a block diagram showing a receiving circuit according to the present invention.

Referring to FIG. 4, a radio system 401 receives a radio signal through an antenna to produce an in-phase (I) component and a quadrature (Q) component of a received baseband signal and an analog-to-digital converter 402 converts them from analog to digital. The digital baseband component signals Rx-I and Rx-Q are subjected to π/4-shift QPSK spectrum despreading by a π/4-shift QPSK despreading circuit 403 to produce despread component data Rd-I and Rd-Q as described in detail later. The despread component data Rd-I and Rd-Q are output to a decision circuit 404 which is comprised of a differential detector or a coherent detector for detecting the 2-bit parallel despread data (Rd-I, Rd-Q) in symbols and then the output component data of the decision circuit 404 are converted from parallel to serial by a parallel-to-serial converter 405 to produce a received data Rd.

The receiver is further provided with a spreading code replica generator 406 and a clock recovery circuit 407. The spreading code replica generator 406 generates spreading code replica sequences SC-Ir and SC-Qr which correspond to the spreading code sequences SC-I and SC-Q generated at the transmitter, respectively. Since the length of spreading code sequence is predetermined (here 64 chips), acquisition and tracking are performed by a controller (not shown) shifting a chip phase in a well-known way.

The clock recovery circuit 407 receives the 2-bit parallel despread data (Rd-I, Rd-Q) from the A/D converter 402 and the received data Rd from the P/S converter 405. The clock recovery circuit 407 reproduces a clock signal CLK1r corresponding to the symbol-rate clock signal CLK1, a clock signal CLK2r corresponding to the chip-rate clock signal CLK2, and a clock signal CLK3r corresponding to the even-odd discrimination clock signal CLK3. The clock signals CLK1r–CLK3r are supplied to the $\pi/4$-shift QPSK despreading circuit 403, the clock signal CLK2r is supplied as a sampling clock to the A/D converter 402, and the clock signal CLK1r is supplied to the decision circuit 404.

Figure 5:
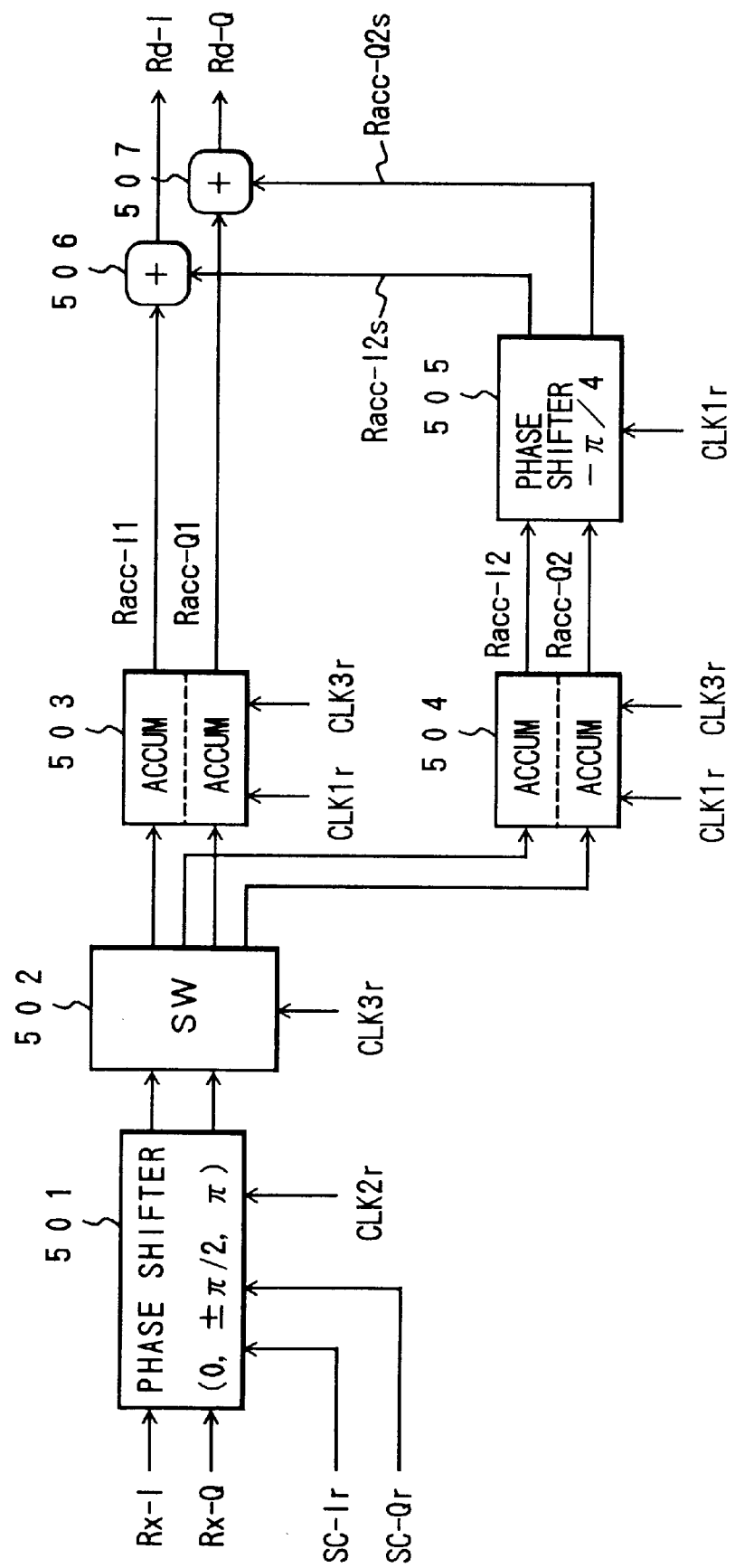
FIG. 5 is a block diagram showing a π/4-shift QPSK despreading circuit of a first embodiment of the receiving circuit according to the present invention.

Referring to FIG. 5, the $\pi/4$-shift QPSK despreading circuit 403 according to the first embodiment includes a third phase shifter 501 which is a QPSK despreading circuit whose configuration is basically similar to the first phase shifter 201 as shown in FIG. 1. The third phase shifter 501 selects a phase shift amount from 0, $+\pi/2$, $-\pi/2$ and $\pi$ depending on the two-bit spreading code replica (SC-Ir, SC-Qr) received from the spreading code replica generator 406 and then shifts the phase of the parallel baseband signal (Rx-I, Rx-Q) by the selected phase shift amount to produce a phase-shifted signal (Rx-Is, Rx-Qs) in accordance with the chip-rate clock signal CLK2r.

The output signal (Rx-Is, Rx-Qs) of the third phase shifter 501 is selectively transferred through a switch 502 to one of a first accumulator 503 and a second accumulator 504. The switch 502 performs the switching operation according to the even-odd discrimination clock signal CLK3r. More specifically, in the case of even chips, the output signal (Rx-Is, Rx-Qs) of the third phase shifter 501 is transferred to the first accumulator 503, and, in the case of odd chips, the signal (Rx-Is, Rx-Qs) is transferred to the second accumulator 504.

The first accumulator 503 accumulates the respective component signals Rx-Is and Rx-Qs for every symbol duration of the symbol-rate clock signal CLK1r in the case of even chips. Similarly, the second accumulator 504 accumulates the respective component signals Rx-Is and Rx-Qs for every symbol duration of the symbol-rate clock signal CLK1r in the case of odd chips.

The output signal (Racc-I2, Racc-Q2) of the second accumulator 504 is output to a fourth phase shifter 505. The fourth phase shifter 505 shifts the phase of the signal (Racc-I2, Racc-Q2) by $-\pi/4$ according to the symbol-rate clock signals CLK1r to produce phase-shifted signals Racc-I2s and Racc-Q2s. The output component signal Racc-I1 of the first accumulator 503 is added to the output component signal Racc-I2s of the fourth phase shifter 505 by an adder 506, and the output component signal Racc-Q1 of the first accumulator 503 is added to the output component signal Racc-Q2s of the fourth phase shifter 505 by an adder 507. Therefore, a combination of the adders 506 and 507 produces the 2-bit parallel despread data (Rd-I, Rd-Q).

More specifically, the third phase shifter 501 performs a phase shifting operation according to the two-bit parallel spreading code replica (SC-Ir, SC-Qr) as shown in the following table III.

TABLE III

| (SC-Ir, SC-Qr) | PHASE SHIFT |
|---|---|
| (0, 0) | 0 |
| (1, 0) | $-\pi/2$ |
| (1, 1) | $\pi$ |
| (0, 1) | $\pi/2$ |

Such a phase shifting operation is realized by a changing of components between I and Q and a sign inversion as in the case of the first phase shifter 201. The details will be described later referring to FIG. 8.

On the other hand, the fourth phase shifter 505 performs a phase shift of $-\pi/4$. Therefore, the fourth phase shifter 505 requires a multiplier in hardware or software. However, since such an operation is performed at a relatively low speed (here, a symbol rate of 60 kHz), the software will suffice for that operation.

Figure 6:
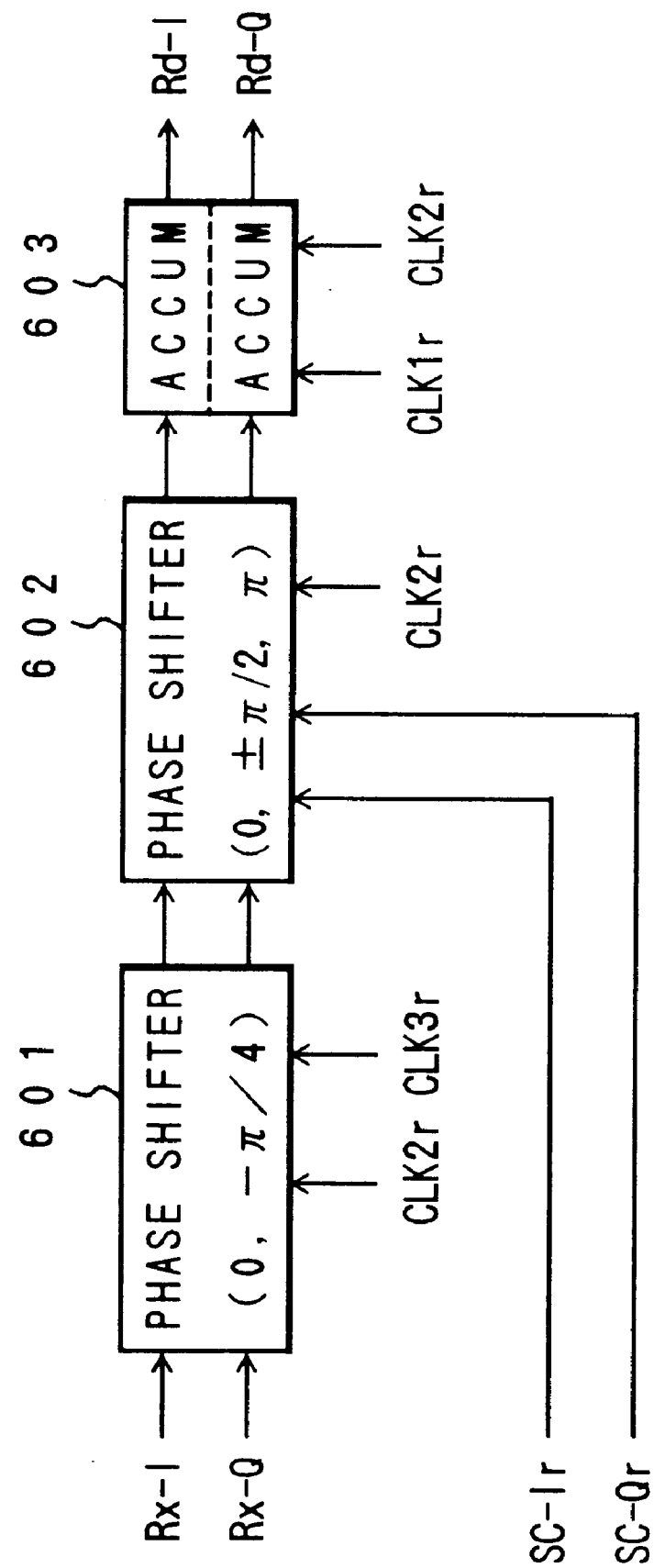
FIG. 6 is a block diagram showing a π/4-shift QPSK despreading circuit of a second embodiment of the receiving circuit according to the present invention.

Referring to FIG. 6, the $\pi/4$-shift QPSK despreading circuit 403 according to the second embodiment is suitable in the case of a relatively small number of quantization bits of the 2-bit parallel despread data (Rd-I, Rd-Q). The $\pi/4$-shift QPSK despreading circuit 403 is comprised of phase shifters 601 and 602 and an accumulator 603. The phase shifter 601 selects a phase shift amount from 0 and $\pi/4$ according to the chip-rate clock signal CLK2r and the even-odd discrimination clock signal CLK3r and then shifts the phase of the parallel baseband signal (Rx-I, Rx-Q) by the selected phase shift amount as shown in the following table IV.

TABLE IV

| EVEN/ODD CHIP DISCRIMINATION | PHASE SHIFT |
|---|---|
| EVEN CHIP | 0 |
| ODD CHIP | $-\pi/4$ |

Such a phase shifting operation is realized by using the parallel baseband signal (Rx-I, Rx-Q) and the even-odd discrimination clock signal CLK3r to address a read-only memory (ROM) in the case of the relatively small number of quantization bits of the parallel baseband signal (Rx-I, Rx-Q), for instance, 4 bits for each channel. The phase shifter 602 performs phase shifting of the output signals of the phase shifter 601 according to the two-bit parallel spreading code replica (SC-Ir, SC-Qr) as shown in the table III. Alternatively, the phase shifter 602 requires a multiplier in hardware or software. As described before, since such an operation is performed at a relatively low speed (here, a symbol rate of 60 kHz), the software will suffice for that operation.

The accumulator 603 accumulates the respective output signals of the phase shifter 602 according to the chip-rate clock signal CLK2r for every symbol duration of the symbol-rate clock signal CLK1r to produce the 2-bit parallel despread data (Rd-I, Rd-Q).

Figure 7:
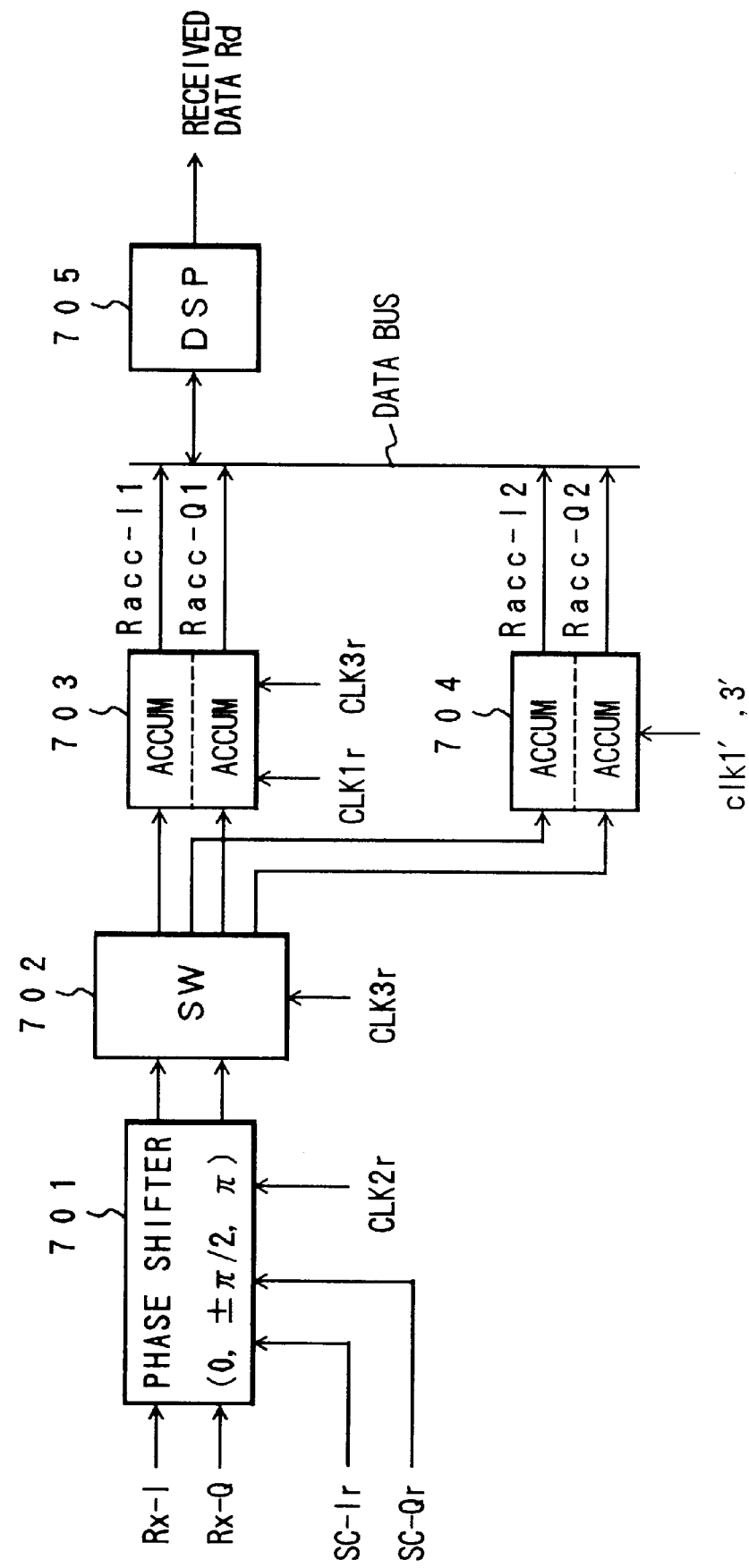
FIG. 7 is a block diagram showing a π/4-shift QPSK despreading circuit of a third embodiment of the receiving circuit according to the present invention.

Referring to FIG. 7, a spread spectrum receiver according to the third embodiment includes a digital signal processor (DSP) 705 which stores a program to implement a part of the $\pi/4$-shift QPSK despreading circuit 403, the decision circuit 404, and the P/S converter 405 in order to achieve a simplified circuit configuration.

In the receiver, a phase shifter 701 is a QPSK despreading circuit whose configuration is similar to the phase shifter 501 as shown in FIG. 5. The phase shifter 701 selects a phase shift amount from 0, +π/2, −π/2 and π depending on the two-bit spreading code replica (SC-Ir, SC-Qr) received from the spreading code replica generator 406 and then shifts the phase of the parallel baseband signal (Rx-I, Rx-Q) by the selected phase shift amount to produce a phase-shifted signal (Rx-Is, Rx-Qs) in accordance with the chip-rate clock signal CLK2r.

The output signal (Rx-Is, Rx-Qs) of the phase shifter 701 is selectively transferred through a switch 702 to one of a first accumulator 703 and a second accumulator 704. The switch 702 performs the switching operation according to the even-odd discrimination clock signal CLK3r. More specifically, in the case of even chips, the output signal (Rx-Is, RX-Qs) of the third phase shifter 701 is transferred to the first accumulator 703, and, in the case of odd chips, the signal (Rx-Is, Rx-Qs) is transferred to the second accumulator 704.

The first accumulator 703 accumulates the respective component signals Rx-Is and Rx-Qs for every symbol duration of the symbol-rate clock signal CLK1r in the case of even chips. Similarly, the second accumulator 704 accumulates the respective component signals Rx-Is and Rx-Qs for every symbol duration of the symbol-rate clock signal CLK1r in the case of odd chips.

The output signals (Racc-I1, Racc-Q1) and (Racc-I2, Racc-Q2) of the first and second accumulators 703 and 704 are output to the DSP 705 through a data bus. The DSP 705 performs the operations of the phase shifter 505 and the adders 506 and 507 to produce the 2-bit parallel despread data (Rd-I, Rd-Q) as described in FIG. 5 and the operations of the decision circuit 404 and the P/S converter 405 to produce the received data Rd as described in FIG. 4. Especially, such an arrangement using the DSP is suitable in the case of the pilot-symbol assisted coherent detection or accumulation demodulation.

In this manner, the high-speed chip-rate processing is performed by dedicated circuits including the A/D converter 402, the spreading code replica generator 406, the phase shifter 701, the switch 702, and accumulators 703 and 704. The relatively low-speed symbol-rate processing is performed by the DSP 705. This causes the hardware arrangement to be simplified without reducing its performance.

Figure 8:
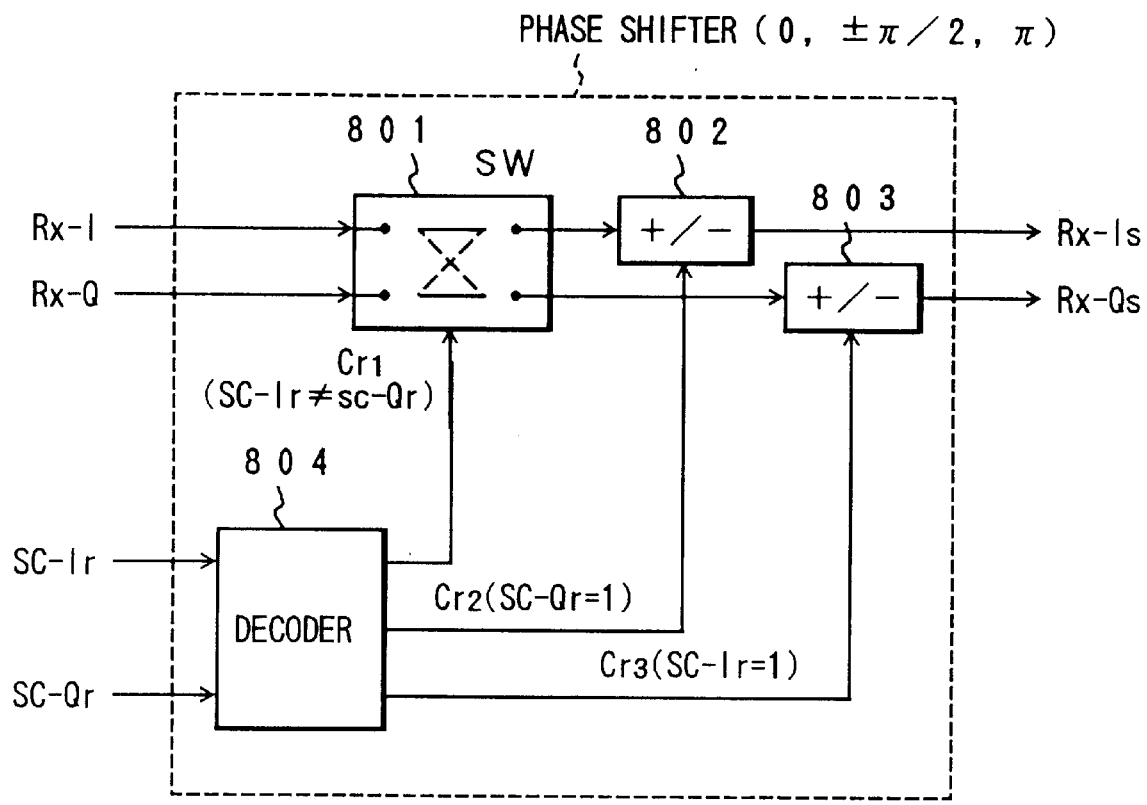
FIG. 8 is a detailed block diagram showing a phase shifter of the π/4-shift QPSK despreading circuit in the receiving circuit.

Referring to FIG. 8, the above-mentioned phase shifter (501, 602, or 701) may be comprised of a switching circuit 801, sign inverters 802 and 803, and a parallel code decoder 804. The switching circuit 801 receives the 2-bit parallel signal (Rx-I, RX-Q) and changes its I and Q components according to a switching control signal Cr1. The I and Q output components of the switching circuit 801 are input to the sign inverters 802 and 803 which are controlled by inverting control signals Cr2 and Cr3 to produce shifted parallel component signals Rx-Is and Rx-Qs, respectively. The parallel code decoder 804 outputs the switching control signal Cr1 to the switching circuit 801 when SC-Ir is not coincident with SC-Qr, outputs the inverting control signal Cr2 to the sign inverter 802 when SC-Qr=1, and outputs the inverting control signal Cr3 to the sign inverter 803 when SC-Ir=1. Such a configuration provides the above phase shifting operation as described in TABLE III.

RECEIVING OPERATION

Taking the receiving circuit as shown in FIG. 5 as an example, the receiving operation will be described hereinafter. Needless to say, the receiving operation of other circuits as shown in FIGS. 6 and 7 will be described similarly.

The phase of the parallel baseband signal (Rx-I, Rx-Q) is shifted by the phase shifter 501 according to TABLE III. The output signals of the phase shifter 501 are selectively transferred through the switch 502 to one of the first accumulator 503 and the second accumulator 504. In the case of even chips, the output component signals of the phase shifter 501 are transferred to the first accumulator 503, and, in the case of odd chips, the signals are transferred to the second accumulator 504. The first accumulator 503 accumulates the respective component signals for each symbol duration in the case of even chips. Similarly, the second accumulator 504 accumulates the respective component signals for each symbol duration in the case of odd chips. The output signals of the second accumulator 504 are output to the phase shifter 505 which shifts the phase of the signals by −π/4. And then, the respective output component signals of the accumulator 503 and the phase shifter 505 are added by the adders 506 and 507 to produce the parallel despread data (Rd-I, Rd-Q).

The despread data (Rd-I, Rd-Q) is output to the decision circuit 404 and then the output component signals of the decision circuit 404 are converted from parallel to serial by the parallel-to-serial converter 405 to produce the received data Rd.

In the receiver as described above, the A/D converter 402 which converts the received component signals from analog to digital is operated according to the chip-rate clock signal CLK2r. Therefore, compared with the conventional receiver employing the Offset QPSK scheme, a necessary sampling clock frequency can be reduced to one-half, resulting in considerably less power consumption in the receiver.

Furthermore, since a π/4-shift QPSK spreading and despreading circuit is employed, the respective signal points of a received signal are concentrated into predetermined signal points of its constellation at sampling time points as shown in FIG. 10A. Therefore, there is substantially no interference between in-phase and quadrature-phase components, resulting in improved characteristics of the receiver.

The embodiments as described above employ the QPSK modulation for the first modulation. However, the present invention can also be easily applied to the system employing the Binary QPSK modulation for the first modulation as shown in FIG. 9.

Figure 9:
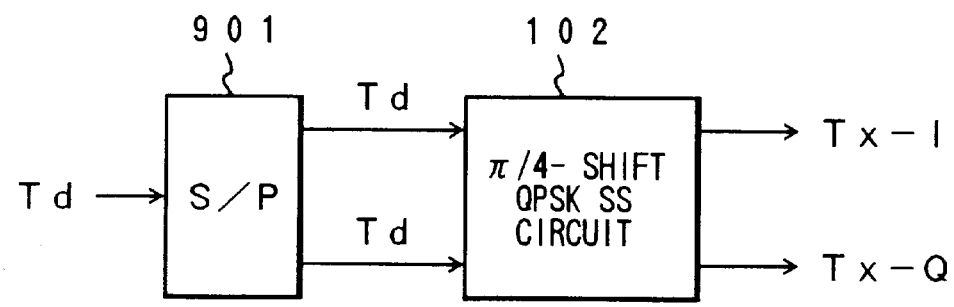
FIG. 9 is a block diagram showing a part of a second embodiment of a transmitting circuit for use in a spread spectrum mobile communications system according to the present invention.

Referring to FIG. 9, the transmitter is provided with a circuit 901 which supplies the transmission data Td as parallel data to the π/4-shift QPSK spreading circuit 102. On the other hand, at the receiver, the decision circuit 404 performs binary decision and the P/S converter 405 is removed.

What is claimed is:
1. A data transmission system comprising a transmitter and a receiver,
   the transmitter comprising:
      converting means for converting transmission data into parallel data according to a symbol timing signal;
      first generating means for generating two spreading code sequences according to a chip timing signal in each symbol interval;
      first means for spreading the parallel data such that the parallel data is modulated based on π/4-shift QPSK (quadrature phase shift keying) scheme according to the spreading code sequences to produce quadrature spread spectrum signals; and
      transmitting means for transmitting a transmission signal which is generated based on the quadrature spread spectrum signals to the receiver, and the receiver comprising:

receiving means for receiving the transmission signal from the transmitter to produce received quadrature spread spectrum signals;

second generating means for generating two despreading code sequences which are replicas of the spreading code sequences, respectively;

second means for despreading the received quadrature spread spectrum signals such that the received quadrature spread spectrum signals are demodulated based on π/4-shift QPSK scheme according to the despreading code sequences to produce received despread data;

reproduction means for reproducing received data from the received despread data; and recovery means for recovering a symbol timing signal and a chip timing signal from the received quadrature spread spectrum signals and the received data.

2. The system according to claim 1, wherein the transmitter further comprises:

spectrum shaping means for spectrum-shaping the quadrature spread spectrum signals;

analog converting means for converting the output signals of the spectrum shaping means into analog quadrature baseband signals;

second converting means for converting the analog quadrature baseband signals to a radio transmission signal; and a transmission power amplifier for amplifying the radio transmission signal in power.

3. The system according to claim 1, wherein the receiver further comprises:

converting means for converting the received quadrature spread spectrum signals into digital quadrature spread spectrum signals according to a recovered chip timing signal.

4. The system according to claim 3, wherein the second means comprises:

third phase shifting means for shifting a phase of the received quadrature spread spectrum signals by one selected from 0 and −π/4 according to the recovered chip timing signal and a second timing signal of one-half the recovered chip rate synchronous with the recovered chip timing signal, to produce phase-shifted quadrature spread spectrum signals;

fourth phase shifting means for shifting a phase of the phase-shifted quadrature spread spectrum signals based on QPSK scheme at a recovered chip rate of the recovered chip timing signal according to the despreading code sequences to produce quadrature despread data; and accumulating means for accumulating the quadrature despread data in each symbol interval to produce the received despread data.

5. The system according to claim 4, wherein the fourth phase shifting means shifts a phase of the phase-shifted quadrature spread spectrum signals by one selected from 0, −π/2 +π/2 and π according to a combination of respective chip levels of the despreading code sequences.

6. The system according to claim 1, wherein said system is a mobile code-division multiple access (CDMA) communications system.

7. A data transmission system comprising a transmitter and a receiver, the transmitter comprising:

converting means for converting transmission data into parallel data according to a symbol timing signal;

first generating means for generating two spreading code sequences according to a chip timing signal in each symbol interval;

first means for spreading the parallel data such that the parallel date is modulated based on π/4-shift QPSK (quadrature phase shift keying) scheme according to the spreading code sequences to produce quadrature spread spectrum signals; and transmitting means for transmitting a transmission signal which is generated based on the quadrature spread spectrum signals to the receiver, and the receiver comprising:

receiving means for receiving the transmission signal from the transmitter to produce received quadrature spread spectrum signals;

second generating means for generating two despreading code sequences which are replicas of the spreading code sequences, respectively;

second means for despreading the received quadrature spread spectrum signals such that the received quadrature spread spectrum signals are demodulated based on π/4-shift QPSK scheme according to the despreading code sequences to produce received despread data;

reproduction means for reproducing received data from the received despread data; and recovery means for recovering a symbol timing signal and a chip timing signal from the received quadrature spread spectrum signals and the received data;

wherein the first means comprises:

first phase shifting means for shifting a phase of the parallel data based on QPSK scheme according to the spreading code sequences at a chip rate of the chip timing signal to produce first quadrature spread spectrum signals; and second phase shifting means for shifting a phase of the first quadrature spread spectrum signals by one selected from 0 and π/4 according to a first timing signal of one-half the chip rate synchronous with the chip timing signal.

8. The system according to claim 7, wherein the second means comprises:

third phase shifting means for shifting a phase of the received quadrature spread spectrum signals based on QPSK scheme at a recovered chip rate of the recovered chip timing signal according to the despreading code sequences to produce first quadrature despread data; and fourth phase shifting means for shifting a phase of the first quadrature despread data by one selected from 0 and −π/4 according to a second timing signal of one-half the recovered chip rate synchronous with the recovered chip timing signal.

9. The system according to claim 8, wherein the third phase shifting means shifts a phase of the received quadrature spread spectrum signals by one selected from 0, −π/2, +π/2 and π according to a combination of respective chip levels of the despreading code sequences.

10. The system according to claim 9, wherein the third phase shifting means comprises:

second switching means for switching between an in-phase signal and a quadrature signal of the received quadrature spread spectrum signals when the respective chip levels of the despreading code sequences are not coincident with each other, to produce a first output in-phase signal and a second output quadrature signal;

third sign inverting means for inverting a sign of the first output in-phase signal when a chip level of an in-phase component of the despreading code sequences is a predetermined logical value; and fourth sign inverting means for inverting a sign of the second output in-phase signal when a chip level of an quadrature component of the despreading code sequences is the predetermined logical value.

11. The system according to claim 7, wherein the first phase shifting means shifts a phase of the parallel data by one selected from 0, $+\pi/2$, $-\pi/2$ and $\pi$ according to a combination of respective chip levels of the spreading code sequences.

12. The system according to claim 11, wherein the first phase shifting means comprises:

first switching means for switching between first data and second data of the parallel data when the respective chip levels are not coincident with each other, to produce first output data and second output data;

first sign inverting means for inverting a sign of the first output data when a chip level of one of the spreading code sequences is a predetermined logical value; and second sign inverting means for inverting a sign of the second output data when a chip level of the other of the spreading code sequences is the predetermined logical value.

13. A data transmission system comprising a transmitter and a receiver, the transmitter comprising:
converting means for converting transmission data into parallel data according to a symbol timing signal;
first generating means for generating two spreading code sequences according to a chip timing signal in each symbol interval;
first means for spreading the parallel data such that the parallel date is modulated based on $\pi/4$ shift QPSK (quadrature phase shift keying) scheme according to the spreading code sequences to produce quadrature spread spectrum signals; and
transmitting means for transmitting a transmission signal which is generated based on the quadrature spread spectrum signals to the receiver, and the receiver comprising:
receiving means for receiving the transmission signal from the transmitter to produce received quadrature spread spectrum signals;
second generating means for generating two despreading code sequences which are replicas of the spreading code sequences, respectively;
second means for despreading the received quadrature spread spectrum signals such that the received quadrature spread spectrum signals are demodulated based on $\pi/4$-shift QPSK scheme according to the despreading code sequences to produce received despread data;
reproduction means for reproducing received data from the received despread data; and
recovery means for recovering a symbol timing signal and a chip timing signal from the received quadrature spread spectrum signals and the received data;

wherein the first means performs spectrum spreading of the parallel data such that the parallel data is mapped on a transmission signal constellation of $\pi/4$-shift QPSK scheme according to respective logical levels of the spreading code sequences and the second timing signal of one-half the recovered chip rate synchronous with the recovered chip timing signal.

14. The system according to claim 13, wherein the first means comprises a memory storing data of possible signal points of the transmission signal constellation, the possible signal points being addressed by a combination of the parallel data, the respective logical levels of the spreading code sequences, and the second timing signal.

15. A data transmission system comprising a transmitter and a receiver, the transmitter comprising:
converting means for converting transmission data into parallel data according to a symbol timing signal;
first generating means for generating two spreading code sequences according to a chip timing signal in each symbol interval;
first means for spreading the parallel data such that the parallel date is modulated based on $\pi/4$ shift QPSK (quadrature phase shift keying) scheme according to the spreading code sequences to produce quadrature spread spectrum signals; and
transmitting means for transmitting a transmission signal which is generated based on the quadrature spread spectrum signals to the receiver, and the receiver comprising:
receiving means for receiving the transmission signal from the transmitter to produce received quadrature spread spectrum signals;
second generating means for generating two despreading code sequences which are replicas of the spreading code sequences, respectively;
second means for despreading the received quadrature spread spectrum signals such that the received quadrature spread spectrum signals are demodulated based on $\pi/4$-shift QPSK scheme according to the despreading code sequences to produce received despread data;
reproduction means for reproducing received data from the received despread data; and
recovery means for recovering a symbol timing signal and a chip timing signal from the received quadrature spread spectrum signals and the received data;

wherein the second means comprises:
third phase shifting means for shifting a phase of the received quadrature spread spectrum signals based on QPSK scheme at a recovered chip rate of the recovered chip timing signal according to the despreading code sequences to produce first quadrature despread data; and
fourth phase shifting means for shifting a phase of the first quadrature despread data by one selected from 0 and $-\pi/4$ according to a second timing signal of one-half the recovered chip rate synchronous with the recovered chip timing signal.

16. The system according to claim 15, wherein the fourth phase shifting means comprises:

connection switching means for switching between a first connection and a second connection to transfer the first quadrature despread data to one of the first and second connections according to the second timing signal;

first accumulating means connected to the first connection, for accumulating the first quadrature despread data in each symbol interval to produce first accumulated data;

second accumulating means connected to the second connection, for accumulating the first quadrature despread data in each symbol interval to produce second accumulated data;

fixed phase shifting means for shifting a phase of the second accumulated data by $-\pi/4$ to produce phase-shifted second accumulated data; and addition means for adding the first accumulated data and the phase-shifted second accumulated data to produce the received despread data.

17. A data transmission system comprising a transmitter and a receiver, the transmitter comprising:

converting means for converting transmission data into parallel data according to a symbol timing signal;

first generating means for generating two spreading code sequences according to a chip timing signal in each symbol interval;

first means for spreading the parallel data such that the parallel date is modulated based on $\pi/4$ shift QPSK (quadrature phase shift keying) scheme according to the spreading code sequences to produce quadrature spread spectrum signals; and transmitting means for transmitting a transmission signal which is generated based on the quadrature spread spectrum signals to the receiver, and the receiver comprising:

receiving means for receiving the transmission signal from the transmitter to produce received quadrature spread spectrum signals;

second generating means for generating two despreading code sequences which are replicas of the spreading code sequences, respectively;

second means for despreading the received quadrature spread spectrum signals such that the received quadrature spread spectrum signals are demodulated based on $\pi/4$-shift QPSK scheme according to the despreading code sequences to produce received despread data;

reproduction means for reproducing received data from the received despread data; and recovery means for recovering a symbol timing signal and a chip timing signal from the received quadrature spread spectrum signals and the received data;

wherein the second means comprises:

third phase shifting means for shifting a phase of the received quadrature spread spectrum signals by one selected from 0 and $-\pi/4$ according to the recovered chip timing signal and a second timing signal of one-half the recovered chip rate synchronous with the recovered chip timing signal, to produce phase-shifted quadrature spread spectrum signals;

fourth phase shifting means for shifting a phase of the phase-shifted quadrature spread spectrum signals based on QPSK scheme at a recovered chip rate of the recovered chip timing signal according to the despreading code sequences to produce quadrature despread data; and accumulating means for accumulating the quadrature despread data in each symbol interval to produce the received despread data.

18. The system according to claim 17, wherein the fourth phase shifting means shifts a phase of the phase-shifted quadrature spread spectrum signals by one selected from 0, $-\pi/2$, $+\pi/2$ and $\pi$ according to a combination of respective chip levels of the despreading code sequences.

19. A data transmission system comprising a transmitter and a receiver, the transmitter comprising:

converting means for converting transmission data into parallel data according to a symbol timing signal;

first generating means for generating two spreading code sequences according to a chip timing signal in each symbol interval;

first means for spreading the parallel data such that the parallel date is modulated based on $\pi/4$ shift QPSK (quadrature phase shift keying) scheme according to the spreading code sequences to produce quadrature spread spectrum signals; and transmitting means for transmitting a transmission signal which is generated based on the quadrature spread spectrum signals to the receiver, and the receiver comprising:

receiving means for receiving the transmission signal from the transmitter to produce received quadrature spread spectrum signals;

converting means for converting the received quadrature spread spectrum signals into digital quadrature spread spectrum signals according to a recovered chip timing signal;

second generating means for generating two despreading code sequences which are replicas of the spreading code sequences, respectively;

second means for despreading the received quadrature spread spectrum signals such that the received quadrature spread spectrum signals are demodulated based on $\pi/4$-shift QPSK scheme according to the despreading code sequences to produce received despread data;

reproduction means for reproducing received data from the received despread data;

recovery means for recovering a symbol timing signal and a chip timing signal from the received quadrature spread spectrum signals and the received data; and wherein the second means comprises:

third phase shifting means for shifting a phase of the digital quadrature spread spectrum signals based on QPSK scheme at a recovered chip rate of the recovered chip timing signal according to the despreading code sequences to produce first quadrature despread data; and fourth phase shifting means for shifting a phase of the first quadrature despread data by one selected from 0 and $-\pi/4$ according to a second timing signal of one-half the recovered chip rate synchronous with the recovered chip timing signal.

20. The receiver according to claim 19, wherein the fourth phase shifting means comprises:

connection switching means for switching between a first connection and a second connection to transfer the first quadrature despread data to one of the first and second connections according to the second timing signal;

first accumulating means connected to the first connection, for accumulating the first quadrature despread data in each symbol interval to produce first accumulated data;

second accumulating means connected to the second connection, for accumulating the first quadrature despread data in each symbol interval to produce second accumulated data;

fixed phase shifting means for shifting a phase of the second accumulated data by $-\pi/4$ to produce phase-shifted second accumulated data; and addition means for adding the first accumulated data and the phase-shifted second accumulated data to produce the received despread data.

21. The receiver according to claim 20, wherein the fixed phase shifting means, the addition means, and the reproduction means are implemented with a program-controlled processor.

22. A communication apparatus comprising a transmitter and a receiver, the transmitter comprising:

first converting means for converting transmission data into parallel data according to a symbol timing signal;

first generating means for generating two spreading code sequences according to a chip timing signal in each symbol interval;

first means for spreading the parallel data such that the parallel data is modulated based on $\pi/4$-shift QPSK (quadrature phase shift keying) scheme according to the spreading code sequences to produce quadrature spread spectrum signals;

spectrum shaping means for spectrum-shaping the quadrature spread spectrum signals;

analog converting means for converting the output signals of the spectrum shaping means into analog quadrature baseband signals;

second converting means for converting the analog quadrature baseband signals to a radio transmission; and a transmission power amplifier for amplifying the radio transmission signal in power, and the receiving comprising:

receiving means for receiving a radio transmission signal to produce received quadrature spread spectrum signals;

converting means for converting the received quadrature spread spectrum signals into digital quadrature spread spectrum signals according to a recovered chip timing signal;

replica generating means for generating two despreading code sequences which are replicas of the spreading code sequences, respectively;

second means for despreading the digital quadrature spread spectrum signals such that the digital quadrature spread spectrum signals are demodulated based on $\pi/4$-shift QPSK scheme according to the despreading code sequences to produce received despread data;

reproduction means for reproducing received data from the received despread data; and recovery means for generating a recovered symbol timing signal and the recovered chip timing signal from the digital quadrature spread spectrum signals and the received data.

23. The communication apparatus according to claim 22 in a mobile communication terminal.

24. The communication apparatus according to claim 22 in a base station.

25. A method for transmitting data from a transmitter to a receiver, comprising the steps of:

at the transmitter, converting transmission data into parallel data according to a symbol timing signal;

generating two spreading code sequences according to a chip timing signal in each symbol interval;

spreading the parallel data such that the parallel data is modulated based on $\pi/4$-shift QPSK (quadrature phase shift keying) scheme according to the spreading code sequences to produce quadrature spread spectrum signals; and transmitting a transmission signal which is generated based on the quadrature spread spectrum signals to the receiver, and at the receiver, receiving the transmission signal from the transmitter to produce received quadrature spread spectrum signals;

generating two despreading code sequences which are replicas of the spreading code sequences, respectively;

despreading the received quadrature spread spectrum signals such that the received quadrature spread spectrum signals are demodulated based on $\pi/4$-shift QPSK scheme according to the despreading code sequences to produce received despread data;

reproducing received data from the received despread data; and recovering a symbol timing signal and a chip timing signal from the received quadrature spread spectrum signals and the received data.

26. The method according to claim 25, wherein the step of spreading the parallel data comprises the steps of:

a first phase shifting step of shifting a phase of the parallel data based on QPSK scheme according to the spreading code sequences at a chip rate of the chip timing signal to produce first quadrature spread spectrum signals; and a second phase shifting step of shifting a phase of the first quadrature spread spectrum signals by one selected from 0 and $\pi/4$ according to a first timing signal of one-half the chip rate synchronous with the chip timing signal.

27. The method according to claim 26, wherein the first phase shifting step shifts a phase of the parallel data by one selected from $0+\pi/2$, $-\pi/2$ and $\pi$ according to a combination of respective chip levels of the spreading code sequences.

28. The method according to claim 27, wherein the first phase shifting step comprises the steps of:

switching between first data and second data of the parallel data when the respective chip levels are not coincident with each other, to produce first output data and second output data;

a first sign inverting step of inverting a sign of the first output data when a chip level of one of the spreading code sequences is a predetermined logical value; and a second sign inverting step of inverting a sign of the second output data when a chip level of the other of the spreading code sequences is the predetermined logical value.

29. The method according to claim 26, wherein the step of despreading the received quadrature spread spectrum signals comprises the steps of:

a third phase shifting step of shifting a phase of the received quadrature spread spectrum signals based on QPSK scheme at a recovered chip rate of the recovered chip timing signal according to the despreading code sequences to produce first quadrature despread data; and a fourth phase shifting step of shifting a phase of the first quadrature despread data by one selected from 0 and $-\pi/4$ according to a second timing signal of one-half the recovered chip rate synchronous with the recovered chip timing signal.

30. The method according to claim 29, wherein the third phase shifting step shifts a phase of the received quadrature spread spectrum signals by one selected from 0, $-\pi/2$, $+\pi/2$ and $\pi$ according to a combination of respective chip levels of the despreading code sequences.

31. The method according to claim 30, wherein the third phase shifting step comprises the steps of:

switching between an in-phase signal and a quadrature signal of the received quadrature spread spectrum signals when the respective chip levels of the despreading code sequences are not coincident with each other, to produce a first output in-phase signal and a second output quadrature signal;

a third sign inverting step of inverting a sign of the first output in-phase signal when a chip level of an in-phase component of the despreading code sequences is a predetermined logical value; and a fourth sign inverting step of inverting a sign of the second output in-phase signal when a chip level of an quadrature component of the despreading code sequences is the predetermined logical value.

32. The method according to claim 25, wherein the step of spreading the parallel data comprises the step of:

spectrum spreading the parallel data such that the parallel data is mapped on a transmission signal constellation of $\pi/4$-shift QPSK scheme according to respective logical levels of the spreading code sequences and the second timing signal of one-half the recovered chip rate synchronous with the recovered chip timing signal.

33. The method according to claim 32, wherein the spreading step further comprises the step of storing data of possible signal points of the transmission signal constellation, the possible signal points being addressed by a combination of the parallel data, the respective logical levels of the spreading code sequences, and the second timing signal.

34. The method according to claim 25, wherein the step of despreading the received quadrature spread spectrum signals comprises the steps of:

a third phase shifting step of shifting a phase of the received quadrature spread spectrum signals based on QPSK scheme at a recovered chip rate of the recovered chip timing signal according to the despreading code sequences to produce first quadrature despread data; and a fourth phase shifting step of shifting a phase of the first quadrature despread data by one selected from 0 and $-\pi/4$ according to a second timing signal of one-half the recovered chip rate synchronous with the recovered chip timing signal.

35. The method according to claim 34, wherein the fourth phase shifting step comprises the steps of:

switching between a first connection and a second connection to transfer the first quadrature despread data to one of the first and second connections according to the second timing signal;

receiving and accumulating, from the first connection, the first quadrature despread data in each symbol interval to produce first accumulated data;

receiving and accumulating, from the second connection, the first quadrature despread data in each symbol interval to produce second accumulated data;

shifting a phase of the second accumulated data by $-\pi/4$ to produce phase-shifted second accumulated data; and adding the first accumulated data and the phase-shifted second accumulated data to produce the received despread data.

36. The method according to claim 25, wherein the step of despreading the received quadrature spread spectrum signals comprises the steps of:

a third phase shifting step of shifting a phase of the received quadrature spread spectrum signals by one selected from 0 and $-\pi/4$ according to the recovered chip timing signal and a second timing signal of one-half the recovered chip rate synchronous with the recovered chip timing signal, to produce phase-shifted quadrature spread spectrum signals;

a fourth phase shifting step of shifting a phase of the phase-shifted quadrature spread spectrum signals based on QPSK scheme at a recovered chip rate of the recovered chip timing signal according to the despreading code sequences to produce quadrature despread data; and accumulating the quadrature despread data in each symbol interval to produce the received despread data.

37. The method according to claim 36, wherein the fourth phase shifting step shifts a phase of the phase-shifted quadrature spread spectrum signals by one selected from 0, $-\pi/2$, $+\pi/2$ and $\pi$ according to a combination of respective chip levels of the despreading code sequences.

38. The method according to claim 25, further comprising the steps of:

converting the received quadrature spread spectrum signals into digital quadrature spread spectrum signals according to a recovered chip timing signal; and generating two despreading code sequences which are replicas of the spreading code sequences, respectively;

wherein the step of despreading the received quadrature spread spectrum signals comprises the steps of:

a third phase shifting step of shifting a phase of the digital quadrature spread spectrum signals based on QPSK scheme at a recovered chip rate of the recovered chip timing signal according to the despreading code sequences to produce first quadrature despread data; and a fourth phase shifting step of shifting a phase of the first quadrature despread data by one selected from 0 and $-\pi/4$ according to a second timing signal of one-half the recovered chip rate synchronous with the recovered chip timing signal.

39. The method according to claim 38, wherein the fourth phase shifting step comprises the steps of:

switching between a first connection and a second connection to transfer the first quadrature despread data to one of the first and second connections according to the second timing signal;

receiving and accumulating, from the first connection, the first quadrature despread data in each symbol interval to produce first accumulated data;

receiving an accumulating, from the second connection, the first quadrature despread data in each symbol interval to produce second accumulated data;

shifting a phase of the second accumulated data by $-\pi/4$ to produce phase-shifted second accumulated data; and adding the first accumulated data and the phase-shifted second accumulated data to produce the received despread data.

40. The method according to claim 39, further comprising the step of controlling the phase shifting step, the addition step, and the reproduction step with a program-controlled processor.

41. The method according to claim 25, further comprising the steps of:

converting the received quadrature spread spectrum signals into digital quadrature spread spectrum signals according to a recovered chip timing signal; and generating two despreading code sequences which are replicas of the spreading code sequences, respectively;

wherein the step of despreading the received quadrature spread spectrum signals comprises the steps of:

a third phase shifting step of shifting a phase of the received quadrature spread spectrum signals by one selected from 0 and $-\pi/4$ according to the recovered chip timing signal and a second timing signal of one-half the recovered chip rate synchronous with the recovered chip timing signal, to produce phase-shifted quadrature spread spectrum signals;

a fourth phase shifting step of shifting a phase of the phase-shifted quadrature spread spectrum signals based on QPSK scheme at a recovered chip rate of the recovered chip timing signal according to the despreading code sequences to produce quadrature despread data; and accumulating the quadrature despread data in each symbol interval to produce the received despread data.

42. The method according to claim 41, wherein the fourth phase shifting step shifts a phase of the phase-shifted quadrature spread spectrum signals by one selected from 0, $-\pi/2$ $+\pi/2$ and $\pi$ according to a combination of respective chip levels of the despreading code sequences.

43. A method for spreading transmission data in a CDMA system, comprising the steps of:

converting the transmission data into an in-phase component and a quadrature component according to a symbol timing signal;

generating an in-phase spreading code sequence and a quadrature spreading code sequence according to a chip timing signal in each symbol interval; and spreading the transmission data by phase-shifting the in-phase component and the quadrature component based on $\pi/4$-shift QPSK scheme according to a combination of the in-phase spreading code sequence and the quadrature spreading code sequence.

44. A method for despreading a spread spectrum signal in a CDMA system, comprising the steps of:

converting the spread spectrum signal into an in-phase digital component and a quadrature digital component according to a recovered chip timing signal;

generating an in-phase despreading code sequence and a quadrature despreading code sequence according to the recovered chip timing signal in each symbol interval; and despreading the spread sprectrum signal by phase-shifting the in-phase digital component and the quadrature digital component based on $\pi/4$-shift QPSK scheme according to a combination of the in-phase despreading code sequence and the quadrature despreading code sequence.

* * * * *